(12) United States Patent
Maas et al.

(10) Patent No.: US 6,586,587 B1
(45) Date of Patent: Jul. 1, 2003

(54) LIGAND-MODIFIED CELLULOSE PRODUCTS

(75) Inventors: Antonius F. Maas, Aj Baexem (NL); Ulla Urpilainen, Aanekoski (FI); Oliver Ruppert, Aanekoski (FI)

(73) Assignee: Noviant Oy, Helsinki (FI)

( * ) Notice: Subject to any disclaimer, the term of this patent is extended or adjusted under 35 U.S.C. 154(b) by 0 days.

(21) Appl. No.: 10/086,627

(22) Filed: Mar. 4, 2002

(51) Int. Cl.[7] .......................... C08B 16/00; C09K 7/00; C09K 7/02; C09K 7/06
(52) U.S. Cl. ................ 536/56; 507/103; 507/104; 507/110; 507/111; 507/112; 507/113; 507/114; 507/115
(58) Field of Search ................. 507/103, 104, 507/110, 111, 112, 113, 114, 115; 536/56

(56) References Cited

U.S. PATENT DOCUMENTS

| | | | |
|---|---|---|---|
| 3,762,476 A | | 10/1973 | Gall |
| 4,018,286 A | | 4/1977 | Gall et al. |
| 4,657,944 A | | 4/1987 | Bruning et al. |
| 5,466,680 A | * | 11/1995 | Rudy et al. |
| 6,291,405 B1 | * | 9/2001 | Lee et al. |
| 6,303,544 B1 | * | 10/2001 | Maas et al. |

FOREIGN PATENT DOCUMENTS

RU    2001936 A    10/1993

* cited by examiner

*Primary Examiner*—James O. Wilson
*Assistant Examiner*—Traviss C. McIntosh, III
(74) *Attorney, Agent, or Firm*—Millen, White, Zelano & Branigan, P.C.

(57) ABSTRACT

The invention relates to a ligand-modified cellulose product comprising cellulose ether, calcium salt and at least one ligand as a chelating agent. The product can be used e.g. in drilling fluids.

22 Claims, No Drawings

LIGAND-MODIFIED CELLULOSE PRODUCTS

FIELD OF THE INVENTION

The invention relates to modified cellulose products comprising cellulose ether, and a ligand. The invention also relates to a method for the preparation of modified cellulose products, and to drilling fluids containing such products.

BACKGROUND

When drilling for oil-, gas-, water-, or other subsoil targets, the drilling process is most commonly performed with a revolving pipe equipped with a device called a bit. This system depends upon the rotation of the column of drill pipe to the bottom of which is attached a multi prolonged drilling bit. The drill bit cuts into the earth, causing to accumulate cuttings as drilling continues. As a result, a fluid must be used to carry these cuttings to the surface for removal, thus allowing the bit to continue functioning and the bottom of the hole to be kept clean and free of cuttings at all times.

When the drilling process is on going, the drilling fluid has to protect the borehole wall from deformation and/or deterioration resulting from reactions of the sediments or formation with the liquid and other containing elements of the said fluid. These chemical and/or physical reactions are resulting from the osmotic and/or crystalline effects. One specific problem in this respect is so called shale hydration.

Shales are a group of mainly clay minerals reacting in various forms with water and salts that might be present during the drilling process or in the underground. This reaction might hamper the drilling process, and in the worst case the process must be totally stopped.

Shales are minerals belonging to the smectic group. The most well known is montmorillonite. Normally this is the most active component in argillaceous formations causing hydrodynamic volume increase when exposed to aqueous environments, called swelling, and problems when drilling.

Illites, kaolinite and chlorite are other members of the active clay group being responsible for well problems based on reaction of ions and water with these clays. These clays can be highly dispersive. In nature these clays are found in a mixed composition with more or less severe potential problems when drilling through.

Shale stabilisation is believed to at least partially be dependent upon inhibition of swelling and dispersion process of the shale by the fluid.

Shales and shale reactions are extensively described in literature like: Van Olphen, H., "An Introduction to Clay Colloid Chemistry", second edition, John Wiley & Sons, New York, 19977, p. 30-; and Darley, H. C. H. and Gray, George R., "Compositions and Properties of Drilling and Completion Fluids" 5th edition, Gulf Publishing Company, Houston, p. 140-.

Some cellulose derivatives are known additives in drilling fluids. They may posses shale inhibiting-, viscosifying-, fluid loss reducing- and thermo stabilizing properties. Especially carboxy methyl cellulose (CMC) has been used as such an additive.

SUMMARY OF THE INVENTION

The modified cellulose product in accordance with the invention comprises cellulose ether, such as carboxymethyl cellulose, carboxymethyl hydroxyethyl cellulose or carboxy methylated starches, at least one ligand selected from the group consisting of nitrilo-tri-acetic acid, ethylene-di-amine-tetra-acetic acid, 1,2-cyclo-hexan-di-amine-N,N,N', N'-tetra-acetic acid, di-ethylene-tri-amine-penta-acetic acid, ethylene-di-oxy-bis (ethylene-nitrilo)-tetra-acetic acid, (N-(2-hydroxy-ethyl)-ethylene-diamine-N,N',N'-tri-acetic acid, tri-ethylene-tetra-amine-hexa-acetic acid, N-(hydroxyethyl) ethylene-di-amine-tri-acetic acid, and at least one salt of calcium.

The product thus comprises a calcium source [e.g. $CaCl_2.2H_2O$ or $Ca(OH)_2$]. The product can be used especially as an additive in drilling fluids. The application of this product leads to a more stable shale-formation without the detrimental effects of the hydration. Calcium ions are environmentally not harmful either in the preparation of the product or in its use. A further advantage in the use is that calcium is not amphoteric.

The products according to the invention can also be used in other applications than drilling fluids. Examples of such use are paper production, coating colors, mining, pharmaceuticals, water purification, ceramics, detergents, and paints.

Another object of the invention is a method for the preparation of the modified cellulose product, the method being characterized in that a cellulose compound is reacted with at least one salt of calcium and with at least one said ligand.

A third object of the invention is a drilling fluid containing the new product.

A fourth object of the invention is the inhibition of shale hydration during drilling by using the new product during drilling.

A fifth independent object of the invention is a product consisting of cellulose ether and said ligand. The ligand may be in the form of a monovalent salt, such as sodium salt. When there is no divalent cation present, the ligand forms direct linkage to the cellulose ether molecules.

DETAILED DESCRIPTION OF THE INVENTION

The cellulose ether used in the invention may be e.g. carboxymethyl cellulose, carboxymethyl hydroxyethyl cellulose or carboxy methylated starches. Especially carboxymethyl cellulose can be used.

It is believed that in the new product calcium ions link the ether group of the cellulose molecule and the ligand(s).

The degree of polymerisation of the cellulose ether influences the viscosity of the product. The higher the polymerisation degree, the higher the viscosity of the resulting product. Suitable degree of polymerisation is e.g. 200–4000.

The degree of substitution of the ether is e.g. 0.5–1.7, especially 0.9–1.5.

The amount of salt used is especially in the range of 0.1–20 wt-%, preferably 0.1–15 wt-%, and most preferably 0.1–5 wt-%, based on dry cellulose. The amount of ligand used is especially in the range of 0.1–20 wt-%, preferably 0.1–5 wt-%, based on dry cellulose.

According to a preferred embodiment of the invention, the ligand is nitrilotriacetic acid.

The product according to the invention can be obtained in a technical form or in a purified form. In technical form it may contain e.g. from 1 to 45 wt-% of sodium chloride and/or sodium glycolates. In purified form it may contain the active ingredient even in a content between 95 and 100 wt-%, such as over 98 wt-%.

The product may comprise also a least one $Mg^{2+}$, $Cr^{3+}$, $Fe^{2+}$, $Fe^{3+}$, $Al^{3+}$, $Ti^{4+}$, $Zn^{2+}$, $Sn^{2+}$, $Be^{2+}$, $Sr^{2+}$, $Ba^{2+}$ or $Ra^{2+}$ salt.

The fact that the compound can be used as a so-called "one-bag product" makes it very versatile in its application processes.

The product can be prepared by reacting cellulose or its derivative with the calcium salt and the ligand. This can be done e.g. by reacting the cellulose with a calcium salt and ligand at an elevated temperature of 40–80° C.

The drilling fluid in accordance with the invention is easy to prepare by mixing the product with other necessary additives. The concentration of the modified cellulose product is e.g. 0.1–15 kg/m³. The make-up water of the drilling fluid may be fresh or distilled water, seawater or salt saturated water or mixtures thereof.

The shale inhibition performance of a modified CMC product according to the invention in a so-called dispersion test proved that this product was more effective as conventional CMC.

The drilling fluid according to the invention may also contain a glycol and/or potassium chloride (KCl) or any other salt, such as $Mg^{2+}$, $Cr^{3+}$, $Fe^{2+}$, $Fe^{3+}$, $Al^{3+}$, $Ti^{4+}$, $Zn^{2+}$, $Sn^{2+}$, $Be^{2+}$, $Sr^{2+}$, $Ba^{2+}$ or $Ra^{2+}$ salts.

Manufacturing

There is a lot of literature on the manufacture of cellulose ethers. Cellulose ethers are generally prepared by mixing wood-based or cotton wool-based raw material with a reaction medium, such as an alcohol (e.g. isopropanol or ethanol) or acetone, and by mercerising it with an alkali substance, such as sodium hydroxide, to activate the cellulose. An etherifying compound e.g. monochloroacetic acid (MCA) in liquid form or its sodium salt (NaMCA) is then added and allowed to react. The resulting product can be neutralized and its viscosity can be reduced if needed. When purified cellulose ether is manufactured, the by-products like salts generated in reaction are washed out with alcohol. The by-products can also be left in the product (technical cellulose ether) or removed only partly (semi-purified cellulose ether). The solvent used is separated and the product is dried. The product can be grinded, granulated or sieved, according to the intended end-use.

The degree of substitution for the e.g. carboxy methyl cellulose part of the product is determined by the reaction kinetics of the process and the concentration of monochloroacetic acid or its sodium salt and the type of cellulose used.

The calcium compound according to the invention and the complexing agent can be added at any point of the reaction before drying the product but the addition at the beginning of the reaction after feeding of the etherifying compound is preferred.

DETAILED EXAMPLES

Following examples 1 and 3 show the preparation of products containing Ca and ligand, example 5 shows the preparation of a product containing a ligand only, and examples 2 and 4 shows the preparation of a product without Ca and ligand.

Example 1

5 kg of wood pulp (Metsä Botnia), 2.111 kg of NaMCA and 9.089 kg of alcohol solvent were added in a reactor and mixed. The reactor was provided with a nitrogen atmosphere as an option. 2.980 kg of sodium hydroxide, diluted with 2.980 kg of water was added and the cellulose was mercerised for 25 minutes at 45° C. 2.346 kg of MCA, diluted with 0.587 kg of water was added. The temperature was raised to 65° C. When temperature was raised, 124 g of $CaCl_2.2H_2O$, diluted with 320 ml of water, and 222 ml of tri-sodium salt of nitrilo-tri-acetic acid (40 wt % water solution) were added. The reaction took place totally for 60 minutes at 65° C. After the reaction, the solvent was recovered and the product was dried to moisture content less than 8 wt %.

Example 2

105 g of wood pulp (Metsä Botnia), 1234 g of alcohol solvent and 18 g of water were mixed together in a closed glass flask, which was provided with a mixer and a nitrogen atmosphere as an option. The flask was placed in a water bath. 63 g of sodium hydroxide, diluted with 63 g of water, was added and the cellulose was mercerised for 30 minutes at 20° C. 72 g of monochloroacetic acid, diluted with 18 g of water was added. The temperature was raised at 70° C. and the reaction took place for 90 minutes at 70° C. The product was washed three times with ethanol. In between the washing steps the filtrate was separated from the product by filtration. After washing the solvent was recovered and the product was dried to moisture content less than 8 wt %.

Example 3

105 g of wood pulp (Metsä Botnia), 1234 g of alcohol solvent and 18 g of water were mixed together in a closed glass flask, which was provided with a mixer and a nitrogen atmosphere as an option. The flask was placed in a water bath. 63 g of sodium hydroxide, diluted with 63 g of water, was added and the cellulose was mercerised for 30 minutes at 20° C. 72 g of monochloroacetic acid, diluted with 18 g of water was added. The temperature was raised at 70° C. After raising the temperature, 1.5 g of $CaCl_2.2H_2O$ and 3 ml of tri-sodium salt of nitrilo-tri-acetic acid (40 wt % water solution) were added. After that the reaction took place for 90 minutes at 70° C. The product was washed three times with ethanol. In between the washing steps the filtrate was separated from the product by filtration. After washing the solvent was recovered and the product was dried to moisture content less than 8 wt %.

Example 4

5 kg of wood pulp (Metsä Botnia), 2.111 kg of NaMCA and 9.089 kg of alcohol solvent were added in a reactor and mixed. The reactor was provided with a nitrogen atmosphere as an option. 2.980 kg of sodium hydroxide, diluted with 2.980 kg of water was added and the cellulose was mercerised for 25 minutes at 45° C. 2.346 kg of MCA, diluted with 0,587 kg of water was added. The temperature was raised to 65° C. The reaction took place totally for 60 minutes at 65° C. After the reaction, the solvent was recovered and the product was dried to moisture content less than 8 wt.

Example 5

5 kg of wood pulp (Metsä Botnia), 2.111 kg of NaMCA and 9.089 kg of alcohol solvent were added in a reactor and mixed. The reactor was provided with a nitrogen atmosphere as an option. 2.980 kg of sodium hydroxide, diluted with 2.980 kg of water was added and the cellulose was mercerised for 25 minutes at 45° C. 2.346 kg of MCA, diluted with 0,587 kg of water was added. The temperature was raised to 65° C. When temperature was raised, 222 ml of tri-sodium salt of nitrilo-tri-acetic acid (40 wt % water solution) was added. The reaction took place totally for 60 minutes at 65° C. After the reaction, the solvent was recovered and the product was dried to moisture content less than 8 wt.

TABLE 1

Typical parameters for the products of examples

| Example | Substitution degree | Viscosity of 2 wt-% water solution in mPas | pH |
|---|---|---|---|
| 1 | 1.16 | 110 | 11.4 |
| 2 | 1.09 | 29 | 10.6 |
| 3 | 1.08 | 25 | 10.5 |
| 4 | 1.16 | 41 | 11.5 |
| 5 | 1.23 | 42 | 11.4 |

Laboratory Results
Dispersion Test (Hot Rolling Test)

As a shale inhibiting test, the so-called dispersion test was performed. The object of this test was to determine a drilling fluid system's inhibitive characteristics towards clay dispersion and shale hydration disintegration.

100 g of crushed and dried clay chips were suspended into a drilling fluid (composition of drilling fluid varied) in hot rolling bomb (volume 500 ml). The bomb was pressurized with nitrogen. The bomb was then hot rolled for 16 hours at 95° C. (203° F) in a so-called hot rolling oven, which is rolling approximately at 40 rpm.

After aging, the samples were cooled and when the cell reached the room temperature the pressure was released and the cell opened. The content was poured onto a 1.18 mm sieve with a receiver. The chips, on the sieve, were then washed with cold fresh water to clean of the adhering mud from the chips. After that the chips were dried in an oven till constant weight.

The more material is recovered on the sieve the better is the inhibiting action of drilling fluid.

This test method cannot be used for comparing one mud system with another unless the test media are identical. In practice only the results for samples tested at the same time can be compared to each other.

The samples produced in above mentioned examples were tested with this described dispersion test. In all tests, 4.5 g of sample was added into 350 ml of drilling fluid. The results are listed in table 2.

TABLE 2

Shale inhibiting test results for samples of example 1 and comparative example 4 (technical samples)

| Product | Recovery wt. % |
|---|---|
| Sample of example 1 | 70.6 |
| Sample of example 4 (0-sample) | 53.5 |

TABLE 3

Shale inhibiting test results for samples of examples 2 and 3 (purified samples)

| Product | Recovery wt. % |
|---|---|
| Sample of example 2 (0-sample) | 65.5 |
| Sample of example 3 | 73 |

TABLE 4

Shale inhibiting test results for samples of examples 4 and 5 (technical samples)

| Product | Recovery wt. % |
|---|---|
| Sample of example 4 (0-sample) | 60.8 |
| Sample of example 5 | 63.6 |

What is claimed is:

1. A ligand-modified cellulose product, comprising cellulose ether, and at least one salt of calcium and at least one ligand selected from the group consisting of nitrilo-tri-acetic acid, ethylene-di-amine-tetra-acetic acid, 1,2-cyclo-hexan-di-amin-N,N,N',N'-tetra-acetic acid, di-ethylene-tri-amine-penta-acetic acid, ethylene-dioxy-bis(ethylene-nitrilo)-tetra-acetic acid, N-(2-hydroxy-ethyl)-ethylene-diamine-N,N,N'-tri-acetic acid, tri-ethylene-tetra-amine-hexa-acetic acid, N-(hydroxyethyl) ethylene-di-amine-tri-acetic acid and mixtures thereof.

2. A product according to claim 1, wherein the cellulose ether comprises carboxymethyl cellulose, carboxymethyl hydroxyethyl cellulose, or carboxy methylated starches.

3. A product according to claim 1, wherein the amount of the calcium salt is in the range of 0.1–20 wt %, based on dry cellulose.

4. A product according to claim 3, wherein the amount of the calcium salt used is in the range of 0.1–15 wt-%, based on dry cellulose.

5. A product according to claim 4, wherein the amount of the calcium salt used is in the range of 0.1–5 wt-%, based on dry cellulose.

6. A product according to claim 1, wherein the amount of the ligand used is in the range of 0.1–20 wt-%, based on dry cellulose.

7. A product according to claim 6, wherein the amount of the ligand is in the range of 0.1–5 wt %, based on dry cellulose.

8. A product according to claim 1, wherein the ligand is nitrilotriacetic acid.

9. A product according to claim 2, wherein the cellulose ether is carboxymethyl cellulose.

10. A product according to claim 1, wherein said product contains 2–45 wt-% of sodium chloride, or 2–45 wt-% of a sodium glycolate, or 2–45 wt-% of a mixture thereof.

11. A product according to claim 1, in a purified form, wherein the content of the ligand modified cellulose product is between 95 and 100 wt-%.

12. A method for the preparation of a ligand-modified cellulose product, wherein a cellulose ether is reacted with at least one salt of calcium and with at least one compound selected from the group consisting of nitrilo-tri-acetic acid, ethylene-di-amine-tetra-acetic acid, 1,2-cyclo-hexan-di-amin-N,N,N',N'-tetra-acetic acid, di-ethylen-tri-amine-penta-acetic acid, ethylen-di-oxy-bis(ethylen-nitrilo)-tetra-acetic acid, (N-(2-hydroxy-ethyl)-ethylen-diamin-N,N',N'-tri-acetic acid, tri-ethylen-tetra-amine-hexa-acetic acid, N-(hydroxyethyl) ethylene-di-amine-tri-acetic acid and mixtures thereof.

13. A drilling fluid, which contains a modified cellulose product according to claim 1.

14. A drilling fluid according to claim 13, wherein the concentration of the modified cellulose product is 0.1–15 kg/m$^3$.

15. A drilling fluid according to claim 13, further comprising a glycol.

16. A drilling fluid according to claim 13, further comprising a salt for enhancing shale inhibition.

17. A drilling fluid according to claim 16, wherein the salt is KCl.

18. A method for inhibiting shale hydration during drilling comprising drilling in the presence of a drilling fluid of claim 13.

19. A ligand-modified cellulose product consisting of cellulose ether, and at least one ligand selected from the group consisting of nitrilo-tri-acetic acid, ethylene-diamine-tetra-acetic acid, 1,2-cyclo-hexan-di-amin-N,N,N',N'-tetra-acetic acid, diethylene-tri-amine-penta-acetic acid, ethylene-di-oxy-bis(ethylene-nitrilo)-tetraacetic acid, N-(2-hydroxy-ethyl)-ethylene-diamine-N,N,N'-tri-acetic acid, triethylene-tetra-amine-hexa-acetic acid, N-(hydroxyethyl) ethylene-di-amine-triacetic acid and mixtures thereof.

20. A product of claim 1, wherein the calcium salt is $CaCl_2.2H_2O$ or $Ca(OH)_2$.

21. A drilling fluid comprising the modified cellulose product of claim 1 and a compound suitable for a drilling fluid.

22. A drilling fluid of claim 21, further comprising a glycol or a slat for enhancing shale hydration.

* * * * *

UNITED STATES PATENT AND TRADEMARK OFFICE
CERTIFICATE OF CORRECTION

PATENT NO. : 6,586,587 B1
DATED : July 1, 2003
INVENTOR(S) : Antonius Franciscus Maas et al.

It is certified that error appears in the above-identified patent and that said Letters Patent is hereby corrected as shown below:

Column 6,
Line 20, change "N-(hydroxyethyl) ethylene-di-amine-tri-acetic" to
-- N-(hydroxyethyl)-ethylene-di-amine-tri-acetic --;
Line 46, change "ligand modified" to -- ligand-modified --; and
Line 57, change "N-(hydroxyethyl) ethylene-di-amine-tri-acetic" to
-- N-(hydroxyethyl)-ethylene-di-amine-tri-acetic --.

Column 8,
Line 1, change "N-(hydroxyethyl)" to -- N-(hydroxyethyl)- --;
Line 9, change "slat" to -- salt --.

Signed and Sealed this

Twenty-seventh Day of July, 2004

JON W. DUDAS
*Acting Director of the United States Patent and Trademark Office*